United States Patent
Haag et al.

(10) Patent No.: US 9,114,528 B2
(45) Date of Patent: Aug. 25, 2015

(54) CONTROL SYSTEM OF A ROBOT

(75) Inventors: Michael Haag, Karlsruhe (DE); Heinrich Munz, Bergatreute (DE); Dirk Jacob, Marktoberdorf (DE); Hans-Peter Klüger, Stadtbergen (DE)

(73) Assignee: KUKA Roboter GmbH, Augsburg (DE)

( * ) Notice: Subject to any disclaimer, the term of this patent is extended or adjusted under 35 U.S.C. 154(b) by 77 days.

(21) Appl. No.: 13/548,288

(22) Filed: Jul. 13, 2012

(65) Prior Publication Data

US 2013/0018507 A1    Jan. 17, 2013

(30) Foreign Application Priority Data

Jul. 13, 2011 (DE) .......... 10 2011 107 169

(51) Int. Cl.
*G06F 19/00* (2011.01)
*B25J 9/16* (2006.01)

(52) U.S. Cl.
CPC ......... *B25J 9/161* (2013.01); *G05B 2219/2205* (2013.01)

(58) Field of Classification Search
CPC ... G06N 3/008; B62D 57/032; G05D 1/0274; G05D 1/0255; G05D 1/0246
See application file for complete search history.

(56) References Cited

U.S. PATENT DOCUMENTS

| | | | |
|---|---|---|---|
| 6,973,560 B1 * | 12/2005 | Rice et al. ................ 712/205 |
| 7,344,122 B2 * | 3/2008 | Gasaway et al. .......... 256/65.11 |
| 7,409,487 B1 * | 8/2008 | Chen et al. ............... 711/6 |
| 7,783,838 B1 * | 8/2010 | Agesen et al. ............. 711/141 |
| 7,945,908 B1 | 5/2011 | Waldspurger et al. |
| 7,962,545 B2 * | 6/2011 | Knauerhase et al. ....... 709/203 |
| 8,037,210 B2 * | 10/2011 | Tang et al. ................ 710/8 |
| 8,468,356 B2 * | 6/2013 | Sahita et al. .............. 713/176 |
| 8,547,868 B2 * | 10/2013 | Ding et al. ............... 370/252 |
| 2002/0055910 A1 * | 5/2002 | Durbin ................... 705/64 |
| 2004/0128670 A1 * | 7/2004 | Robinson et al. ............ 718/1 |
| 2004/0181782 A1 * | 9/2004 | Findeisen ................ 717/130 |
| 2005/0160151 A1 * | 7/2005 | Rawson, III .............. 709/213 |
| 2007/0260831 A1 * | 11/2007 | Michael et al. ............ 711/162 |
| 2008/0028410 A1 * | 1/2008 | Cherkasova et al. ....... 718/104 |
| 2008/0059769 A1 * | 3/2008 | Rymarczyk et al. ....... 712/209 |
| 2008/0092137 A1 * | 4/2008 | Anderson et al. ........... 718/1 |
| 2008/0141220 A1 | 6/2008 | Kim et al. |
| 2009/0132057 A1 | 5/2009 | Kettu et al. |
| 2009/0133042 A1 * | 5/2009 | Forin et al. .............. 719/331 |

(Continued)

FOREIGN PATENT DOCUMENTS

| | | |
|---|---|---|
| CN | 101403983 A | 4/2009 |
| CN | 101488098 A | 7/2009 |

(Continued)

OTHER PUBLICATIONS

German Patent Office; Search Report in German Patent Application No. 10 2011 107 169.9 dated Sep. 30, 2013; 8 pages.

(Continued)

*Primary Examiner* — Ian Jen
(74) *Attorney, Agent, or Firm* — Wood, Herron & Evans, LLP

(57) ABSTRACT

An invention-based control system for at least one robot comprises a, especially symmetric, multi-core architecture with a first virtual machine (V1) with at least one computing engine (C3), which has been provided for controlling at least one process application (P) of this robot.

11 Claims, 1 Drawing Sheet

(56) References Cited

U.S. PATENT DOCUMENTS

| | | | |
|---|---|---|---|
| 2009/0165134 A1* | 6/2009 | Flake et al. | 726/22 |
| 2009/0182979 A1* | 7/2009 | Farrell et al. | 712/200 |
| 2010/0118884 A1* | 5/2010 | Hendel et al. | 370/412 |
| 2010/0161929 A1* | 6/2010 | Nation et al. | 711/170 |
| 2010/0205602 A1* | 8/2010 | Zedlewski et al. | 718/1 |
| 2011/0022773 A1* | 1/2011 | Rajamony et al. | 711/3 |
| 2011/0061043 A1* | 3/2011 | Rydh et al. | 717/131 |
| 2011/0126203 A1* | 5/2011 | Fahrig | 718/102 |
| 2011/0145510 A1* | 6/2011 | Woffinden | 711/141 |
| 2011/0320825 A1* | 12/2011 | Greiner et al. | 713/190 |
| 2012/0011500 A1* | 1/2012 | Faraboschi et al. | 718/1 |
| 2013/0067135 A1* | 3/2013 | Pandey et al. | 711/6 |
| 2013/0215754 A1* | 8/2013 | Tripathi et al. | 370/236 |

FOREIGN PATENT DOCUMENTS

| | | |
|---|---|---|
| CN | 101911019 A | 12/2010 |
| DE | 10 2006 012 042 A1 | 9/2007 |
| DE | 10 2006 040 416 A1 | 3/2008 |
| DE | 10 2008 058 518 A1 | 5/2010 |
| EP | 2 341 405 A2 | 7/2011 |

OTHER PUBLICATIONS

Zhang, J.; Chen, K; Zuo, B.; Ma, R,; Dong, Y.; Guan, H.: "Performance Analysis Towards a KVM-Based Embedded Real-Time Virtualization Architecture", in: Proceedings of the 5th IEEE International Conference on Computer Sciences and Convergence Information, Nov. 30, 2010-Dec. 2, 2010, S. 421-426.

Chinese Patent Office; Office Action in Chinese Patent Application No. 201210244542.4 dated Apr. 17, 2014; 12 pages.

Wong et al.; Publication entitled "Implementation Of Asymmetric Multiprocessing Framework in Humanoid Robot" dated Dec. 31, 2010; 6 pages.

Chinese Patent Office; Search Report in Chinese Patent Application No. 201210244542.4 dated Apr. 5, 2014; 2 pages.

* cited by examiner

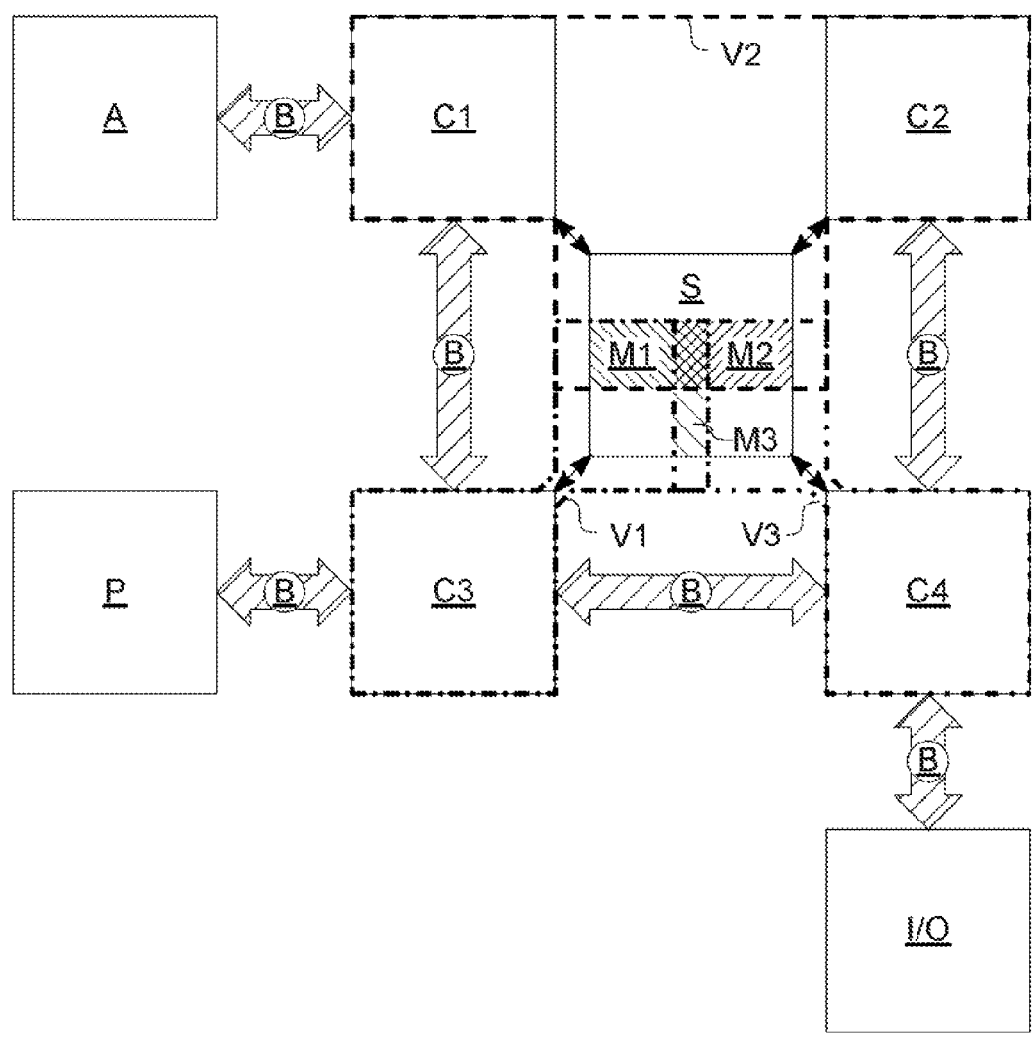

CONTROL SYSTEM OF A ROBOT

The present invention concerns a control system for a robot with multi-core architecture, comprising virtual machines, as well as a method for controlling robots having such a control system.

Based on our company-internal experience robots are controlled through motion control, while process applications, for example, welding guns, have their own process controls, different from this concept. These separate controls communicate via field busses. For example, the motion control reports to the process control that the robot has approached a welding spot, whereupon the process control closes the welding gun and loads it with welding current. When the welding process is finished, the process control reports this to the motion control, which then approaches the next welding spot.

Unfortunately this involves that the time of information transfer varies. This variation can range between a minimum, which is preset by the transmission time of the field bus, and a maximum, which results from adding the cycle times of the one control, the field bus and the other control. These variations, the so-called jitter, affect the repeatability of the robot processes.

The present invention has the objective of improving a robot control.

This objective is achieved through a control comprising the characteristics of Claim 1 or a method involving the characteristics of Claim 8. Advantageous further developments of the invention are included in the sub-claims.

An invention-based control has the objective of controlling a robot or an arrangement of several robots. For a more compact representation we would place under the general term control also a regulation, i.e., presetting of control factors in consideration of repatriated actual values.

The control system comprises a multi-core architecture with at least two, in particular at least three, preferably four, six or more, preferably double integer computing engines. In a preferred embodiment, the multi-core architecture is formed by a microprocessor on a chip with several computing engines, wherein in this context the term computing engine refers to an at least basically complete central processing unit (CPU), which comprises its own arithmetic logic unit, its own register, its own instruction decoder and/or its own floating point unit. Similarly a multi-core architecture in the sense of the present invention can be formed also by multi-threaded-CPUs with several program counters and register sets, acting as several cores. It is even possible to combine them, for example, combining a dual core processor with two threads per core, as, for example the IBM Power5 processor, or an eight core processor with four threads per core, as for example, the Sun UltraSPARC T1 processor.

According to the invention, at least one, preferably two or several virtual machines are represented by means of the multi-core architecture. One virtual machine in the sense of the present invention involves especially an instance or computing environment, which is preferably software or programmatically implemented, and which preferably acts as an independent, physical computer, which means that several virtual machines can run simultaneously on the same physical computer. In particular, a virtual machine can comprise or be its own operating system and/or its own runtime environment, under or in which programs can be implemented. In particular, it is possible to provide within those virtual machines runtime environments which, on their part, act as virtual machines, for example, a Java Virtual Machine or KUKA-.PLC ProConOs by the applicant.

According to the invention, a process control, which controls one, several or all process applications of one robot or several robots of a robot arrangement, is implemented by a first virtual machine, which comprises one or several computing engines of the multi-core architecture.

In a preferred embodiment, a motion control, which controls one, several or all drivers of this robot or this robot arrangement, is implemented by a second virtual machine, which comprises one or several further computing engines of the multi-core architecture.

Therefore, the process control is integrated as a virtual machine directly into the robot control of at least one particular computing engine of a multi-core architecture, in which the motion control is implemented as the other virtual machine of the multi-core architecture. This has the advantage that the above-mentioned jitter can be reduced or prevented, especially when in one preferred embodiment these two virtual machines are synchronized. In addition, or alternatively, it is possible to reduce hardware, installation space, operating energy, waste heat and/or wiring costs and/or to share resources, such as special input and/or output facilities, memory devices, communication networks, interfaces and the like. In addition or alternatively, besides motion control, an invention-based implementation of a process control as further virtual machine can increase mutual, process-oriented robot programming, mutual user and/or policy management, diagnosis and/or recording for motion and process control, and/or allow for an implementation of an integrated safety monitoring system of robot motions and process applications and/or increase the system availability. Especially when in a preferred embodiment both virtual machines have a shared memory, it is possible to improve archiving and/or Online-quality control, because the required data is available in one location and therefore simultaneously available.

Advantageously, this allows the robot manufacturer to provide a container with definite interfaces, in which the process manufacturer can easily integrate his process control. In particular, this makes it possible to simplify modifications of a process control. Preferably, this reduces the risk that a slow or defective process control impedes or sabotages the motion control. Advantageously, it is also possible to perform a restart of the process control without restarting the motion control. It is also of advantage that on different virtual machines different runtime environments or operating systems are realized, as, for example, VxWorks (SMP), Windows CE or VxWin, QNX, On Time RTOS32 or EUROS. Correspondingly, a virtual machine, which has been provided for a particular task, especially a process control, involves in particular a virtual machine that is equipped to perform this particular task, possibly after it has been implemented in a container.

Especially when the multi-core architecture comprises an additional computing engine, a third virtual machine can be provided for user communication, data processing and/or data administration. While, preferably, the first and/or second virtual machine comprise real-time operating systems (RTOS) for process or motion control, the preferred embodiment of the third virtual machine does not real-time capabilities (N-RTOS), but can, for example, perform a Windows operating system. In the present case, user communication involves especially data input by a user, for example, by means of a keyboard or graphic based, especially through mouse or touch screen, and/or data input, especially on a monitor, data administration involves especially organizing and/or saving data, data processing involves a logical and/or arithmetic combination of data. Accordingly, the third virtual machine can be used especially for programming, performing and/or modifying the motion and/or process control.

In a preferred embodiment, each computing engine is used only by one virtual machine. In an alternative embodiment, two or more virtual machines can jointly access one or several computing engines. In a preferred development of the invention, the second virtual machine has two computing engines, the first virtual machine has one computing engine. In a preferred embodiment, at least two, preferably all computing engines are identical, i.e., the multi-core architecture is symmetrical, so that the virtual machines can be distributed selectively to the different cores. However, similarly it is also possible to provide an asymmetrical multi-core architecture, which has the advantage that the cores and virtual machines can be specifically adapted to one another.

Preferably, two or more, in particular all virtual machines of the multi-core architecture have a shared memory, respectively. This shared memory (SM) can comprise, respectively, the complete physical memory of the multi-core architecture or only a particular section of it. This allows for quick, reliable data exchange. At the same time, it is possible to provide programmatically a shared memory as an individual section of a physical memory. In a preferred development of the invention, a virtual machine can access the shared memory of two additional virtual machines or an individual section of it. For example, all virtual machines can be provided with an absolute system time clock. In a similar manner, provision can be made that in particular only two virtual machines have access to the shared memory instead of all virtual machines, especially in order to prevent data corruption or an impairment of real-time capability.

In a preferred embodiment, the motion control is able to store in the shared memory images of a bus by means of which it communicates with the drivers and/or sensors, so that the process control can preferably have access to them, especially to engine and joint positions or the values of other sensors, for example, distance sensors, only in reading mode. In particular, the process control can set flags in the shared memory and in this way inform the motion control about the process status and preferably command the processing of further motion steps. In general, one or several virtual machines can control, especially by means of pointers and/or spin locks, the access to the shared memory. In addition or alternatively, a data range of a virtual I/O-driver can be displayed in a shared memory.

In addition or alternatively to this communication via shared memories, a bus for communication of one virtual machine with one or several further virtual machines can be provided. In this context, a bus involves especially generalized a physical or virtual network and/or network protocol, in particular a field bus and preferably a real-time-capable bus, especially an EtherCAT.

The virtual machine is able to communicate via this or any additional bus with robot drivers. In addition or alternatively, the virtual machine is able to communicate via this or any additional bus with process application peripheries, input and/or output facilities for user communication, memory devices and/or interfaces. It is therefore possible that different busses are involved, or two or several communications can take place via the same bus. For example, the motion control can communicate via a real-time-capable field bus with the drivers of a robot or a robot arrangement. In one embodiment, the process control can communicate via this bus also with its periphery and the motion control, thus receiving directly the data of the drivers. Similarly, the communication between motion control and drivers, on the one hand, and process control and periphery, on the other hand, can also take place via different field busses and the process control can receive data of the drivers from the shared memory by displaying an image of the field busses between motion control and drivers.

In a preferred embodiment, a safety monitoring system has been provided. Preferably, this can be provided in a virtual machine in the sense of the present computing environment, i.e., especially in a preferably programmatically defined instance environment of the multi-core architecture. In particular, this can involve the second virtual machine. In a preferred embodiment, different cores of the second virtual machine can be provided for motion control and for a safety monitoring system, provided the second virtual machine has at least two computing engines. Similarly, it can be preferred to distribute the redundant, preferably diverse safety monitoring system, to two or more cores and/or two or more virtual machines. Preferably, the safety monitoring system communicates with the process control via a virtual I/O driver, which has a data range that can be displayed in the shared memory. In this context, a safety monitoring system involves especially the professional comparison of actual values of the robots or robot arrangements with permissible limit values, the monitoring of workspaces and/or shelters, entrance ways and the like.

In particular, a process application in the sense of the present invention can involve a cutting application, especially a cutting application with a solid blade or a cutting application without a solid blade, as, for example, a water jet cutting or laser cutting application. In this context, such a cutting application can involve also a general machining application, especially a milling and/or sawing application. In particular, a periphery of such a cutting application can comprise a robot-controlled cutting or milling head which have drivers and, preferably sensors, for example, for distance or position measurements.

In addition or alternatively, a process application can involve a joining application, especially a gluing, welding, screwing, riveting and/or sticking application. In particular, a periphery of such a joining application can comprise a robot-controlled glue or rivet gun or welding gun, a robot-controlled screwdriver or grabber, or the like, which have drivers and, preferably, sensors.

Moreover, in addition or alternatively, a process application can involve a surface processing application, especially a coating application, preferably a varnishing and/or polishing application. In particular, a periphery of such a surface processing application can comprise a robot-controlled spray gun, a robot-controlled polishing disc, or the like, which have drivers and, preferably, sensors.

Furthermore, in addition or alternatively, a process application can involve a transportation application, especially a grabbing application. In this context, a grabbing application involves generally a detachable, mechanical, especially a form and/or friction locking, pneumatic and/or (electro) magnetic fixation of a work piece to a robot. In particular, a periphery of such a transportation application can comprise a mechanical, (electro) magnetic and/or vacuum gripper.

As mentioned above, in one preferred embodiment, two or more virtual machines have been synchronized. For this purpose, one or several virtual machines can receive synchronization interrupts from a different virtual machine. In addition or alternatively, it is also possible to synchronize via an absolute system timer, with which the virtual machines to be synchronized communicate.

Further advantages and characteristics are included in the sub-claims and the embodiments. To this end, the only figure shows, partly in schematized form, the following:

FIG. 1: a control system of a robot according to an embodiment of the present invention.

FIG. 1 shows a control system of a robot with a (jointly displayed) plurality of drivers A, which comprise a multi-core architecture with four separate physical computing engines C1 . . . C4 and a physical memory S, with which the computing engines C1 . . . C4, exchange data in customary manner, as indicated by the double arrows.

As indicated in FIG. 1 by a dashed line, the motion control for the drivers A is implemented in a second virtual machine V2, which comprises the computing engine C1, C2, as well as part of the physical memory S. A safety monitoring system is implemented redundantly on the first and second computing engine C1, C2 of the second virtual machine and monitors the robot and its process applications, for example, a welding process with a welding gun, varnishing process with a spray gun or a grabbing process with a grabber, the actuators and sensors of which, for example, engines, electrodes and dynamometers of the welding gun, valve, pressure and filling level sensors of the spray gun or electromotive and/or—magnetic, hydraulic and/or pneumatic grabber drivers are shown in FIG. 1 jointly as periphery P of the process application.

This process application is controlled by a process control. As indicated in FIG. 1 by a dashed line, this process control is implemented in a first virtual machine V1, which comprises the third computing engine C3, as well as part of the physical memory S, which partially intersects with the part which is also allocated to the second virtual machine. This intersection (shown hatched in FIG. 1) forms a shared memory M1 of the first and second virtual machine V1, V2.

Each of these two virtual machines V1, V2 has different, real-time-capable runtime environments or operating systems. In this way, it is easy for a process manufacturer to integrate his process control in the control system.

As indicated in FIG. 1 by a dashed-dotted line, the fourth computing engine C4 involves a third virtual machine V3 with a non-real-time capable Windows operating system implemented especially for user communication, as well as data administration. The third virtual machine V3 comprises also part of the physical memory S, which partially intersects with the part allocated to the second virtual machine V2, partially with the part allocated to the first virtual machine V1, and partially with the part allocated to the first and second virtual machine V1, V2. These intersections form a shared memory M2 of the second and third virtual machine V2, V3 (shown hatched in FIG. 1), a shared memory M3 of the first and third virtual machine V1, V3 (shown hatched in FIG. 1), or a shared memory M1∩M2∩M3 for all three virtual machines V1 . . . V3 (shown cross-hatched in FIG. 1).

FIG. 1 shows hatched a virtual bus B by means of which the first virtual machine V1 is communicating for process control with the periphery P of the process application, the second virtual machine V2 is communicating for motion control with the drivers A of the robot, and the third virtual machine V3 is communicating with an input and output facility I/O, for example, a keyboard, a monitor and/or a hand-held controller, as well as the three virtual machines V1 . . . V3 are communicating among one another, i.e., are exchanging uni or bidirectional data. Similarly, it is also possible to provide separate busses for communication between the first virtual machine V1 and the periphery P, between the second virtual machine V2 and the drivers A, between the third virtual machine V3 and the input and output facility I/O, between the first and the second virtual machine V1, V2, between the first and the third virtual machine V1, V3 and/or between the second and the third virtual machine V2, V3. Preferably, one or several busses are designed as EtherCAT-Bus.

On the one hand, the three virtual busses communicate via the virtual bus or busses B and, on the other hand, via the shared memory M1 . . . M3.

For example, the process control communicates with the Windows application for user communication via the internal, multi-user-capable virtual TCP/UDP/IP-network B. For example, in this way a process control surface can be displayed on the monitor and/or the hand-held controller. Additionally, it is possible by means of routing via the second virtual machine V2 to communicate by means of the runtime environment VxWorks (SMP) with an engineering system for the process control.

The shared memory M1 is available as communication interface for motion control. The respective functionality of this memory is preset by the process control manufacturer and the process control can access the memory in reading and writing mode. Since the process control runs on a separate computing engine C3, the process control cannot make any direct invocations into the motion control or the Windows application. Instead, all desired functionalities which should trigger actions in the motion control have to be displayed on the shared memory and respectively programmed on the side of the motion control. When the function has been performed, the motion control can respond by returning a status or error message. It is recommended not to wait for this response actively circling on the spot but to analyze the response in the cycle of the process control.

For communication with the drivers A, including their sensors, for example, angular encoders or the like, the following mechanisms are available for the process control: it is possible to display cyclically data images of the field busses between drivers A and the second virtual machine V2 in the address space of the process control in the shared memory M1. The administration of access to these data images takes place via this shared memory M1. Here pointers and spin locks for locking the accesses can be filed. In addition or alternatively, it is possible to communicate acyclic via the virtual TCP/UDP/IP network B, for example, by means of CoE (CAN application layer over EtherCAT). For this purpose, it is possible to use with EtherCAT the remote API.

For communication with the motion control and/or the safety monitoring system, a virtual I/O driver is available, the data range of which is also displayed in the shared memory. Administration also takes place via pointers and spin locks for locking.

By means of the shared memory, the process control can access also the global administration data of the motion control, such as the global EtherCAT system time, and is thus able to synchronize via the absolute system time precisely with the motion control.

REFERENCE LIST

A drivers of the robots
B virtual bus
C1 . . . C4 computing engine
I/O input and output facility (keyboard, monitor, hand-held controller)
M1 . . . M3 shared memory
P periphery
S physical memory
V1 . . . V3 virtual machine

The invention claimed is:

1. A control system for at least one robot, with a, especially symmetrical, multi-core-architecture formed by a microprocessor on a chip with several computing engines said multi-core-architecture representing a first virtual machine, wherein said first virtual machine comprises at least one of said computing engines, and wherein the first virtual machine has been provided for controlling at least one process application of a robot, wherein the multi-core architecture comprises a second virtual machine with at least one further computing engine, and the second virtual machine has been provided for motion control with at least one drive of the robot.

2. The control system according to claim 1, wherein the multi-core architecture comprises a third virtual machine with at least one further computing engine, which has been provided for user communication, data processing and/or data administration.

3. The control system according to claim 2, wherein at least two of the virtual machines have a shared memory.

4. The control system according to claim 1, further comprising:

at least one bus for communication of one virtual machine with at least one further virtual machine, at least one drive, at least one robot, at least one periphery, at least one process application, at least one input and output facility for user communication, at least one interface and/or at least one memory.

5. Control system according to claim 1, further comprising a safety monitoring system.

6. Control system according to claim 1, characterized in that a process application comprises a cutting application, especially a cutting and joining application, especially a gluing, welding, screwing, riveting and/or sticking application, a surface processing application, especially a coating, preferably varnishing, and/or polishing application, and/or a transporting application, especially a grabbing application.

7. A method for controlling at least one robot, comprising:

controlling at least one process application of the at least one robot with a first virtual machine of a control system, wherein the control system is connected to a plurality of drives of at least one robot, and the control system comprises a shared memory and a microprocessor on a chip that includes a plurality of processing cores configured in a plurality of computing engines, wherein the first virtual machine is implemented in a first computing engine of the plurality of computing engines and configured to control at least one process application of the robot, and wherein a second virtual machine is configured for motion control with at least one drive of the plurality of drives of the robot.

8. The method of claim 7, wherein the control system further comprises at least one further virtual machine, at least one periphery, at least one additional process application, at least one input and/or output facility for user communication and/or at least one shared memory for communication and/or via a bus.

9. The method of claim 7, wherein the first virtual machine and the second virtual machine are synchronized.

10. The method of claim 7, wherein a program to be processed from the second virtual machine for controlling the at least one drive of the robot and a program to be processed from the first virtual machine for controlling the at least one process application of the robot are prepared mutually or separately in different runtime environments.

11. A control system for at least one robot, with a, especially symmetrical, multi-core-architecture formed by a microprocessor on a chip with several computing engines said multi-core-architecture representing a first virtual machine, wherein each of said computing engines is used only by one virtual machine, and wherein the first virtual machine has been provided for controlling at least one process application of a robot.

* * * * *